US007905956B2

(12) United States Patent
Utagaki et al.

(10) Patent No.: US 7,905,956 B2
(45) Date of Patent: *Mar. 15, 2011

(54) FIBER REINFORCED CEMENT COMPOSITION AND PRODUCTS AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 1430 days.

This patent is subject to a terminal disclaimer.

(21) Appl. No.: 11/354,241

(22) Filed: Feb. 15, 2006

(65) Prior Publication Data
US 2007/0186822 A1 Aug. 16, 2007

(51) Int. Cl.
C04B 14/00 (2006.01)
C04B 14/04 (2006.01)
C04B 14/18 (2006.01)
C04B 14/20 (2006.01)
C04B 18/24 (2006.01)

(52) U.S. Cl. ......... 106/644; 106/705; 106/713; 106/714; 106/716; 106/724; 106/730; 106/731; 106/737; 106/DIG. 1; 106/DIG. 2; 106/DIG. 3; 264/333

(58) Field of Classification Search .................. 106/713, 106/737, 644, 705, 714, 716, 724, 730, 731, 106/DIG. 1, DIG. 2, DIG. 3; 264/333
See application file for complete search history.

(56) References Cited

U.S. PATENT DOCUMENTS

| 3,841,885 | A | | 10/1974 | Jakel | |
|---|---|---|---|---|---|
| 3,972,972 | A | | 8/1976 | Yano et al. | |
| 4,101,335 | A | * | 7/1978 | Barrable | 106/644 |
| 4,985,119 | A | | 1/1991 | Vinson et al. | |
| 5,188,889 | A | | 2/1993 | Nagatomi et al. | |
| 5,804,003 | A | | 9/1998 | Nishizawa | |
| 5,858,083 | A | | 1/1999 | Stav et al. | |
| 5,945,044 | A | | 8/1999 | Kawai et al. | |
| 6,001,169 | A | | 12/1999 | Kawai | |
| 6,138,430 | A | * | 10/2000 | Van Acoleyen et al. | 52/745.19 |
| 6,506,248 | B1 | * | 1/2003 | Duselis et al. | 106/713 |
| 6,572,697 | B2 | * | 6/2003 | Gleeson et al. | 106/705 |
| 6,605,148 | B2 | | 8/2003 | Shirakawa et al. | |
| 6,676,745 | B2 | * | 1/2004 | Merkley et al. | 106/726 |
| 6,872,246 | B2 | * | 3/2005 | Merkley et al. | 106/805 |
| 7,344,593 | B2 | * | 3/2008 | Luo et al. | 106/726 |
| 7,621,087 | B2 | | 11/2009 | Utagaki et al. | |
| 2001/0047741 | A1 | * | 12/2001 | Gleeson et al. | 106/709 |
| 2003/0205172 | A1 | * | 11/2003 | Gleeson et al. | 106/679 |
| 2004/0168615 | A1 | * | 9/2004 | Luo et al. | 106/805 |
| 2005/0235883 | A1 | * | 10/2005 | Merkley et al. | 106/805 |
| 2006/0043627 | A1 | | 3/2006 | Sugita et al. | |
| 2007/0245930 | A1 | | 10/2007 | Utagaki et al. | |
| 2008/0148999 | A1 | * | 6/2008 | Luo et al. | 106/805 |
| 2008/0203365 | A1 | * | 8/2008 | Gleeson et al. | 252/601 |

FOREIGN PATENT DOCUMENTS

| JP | 54-99131 A | 8/1979 |
|---|---|---|
| JP | 58-110443 A | 7/1983 |
| JP | 61-256956 A | 11/1986 |
| JP | 1-242452 A | 9/1989 |
| JP | 1-320243 A | 12/1989 |
| JP | 3-97644 A | 4/1991 |
| JP | 3-257052 A | 11/1991 |
| JP | 04-042875 A | 2/1992 |
| JP | 04-114937 A | 4/1992 |
| JP | 4-160045 A | 6/1992 |
| JP | 4-187552 | 7/1992 |
| JP | 04-193748 A | 7/1992 |
| JP | 04-295072 A | 10/1992 |
| JP | 4-305041 A | 10/1992 |
| JP | 5-124845 | 5/1993 |
| JP | 05-229859 A | 9/1993 |
| JP | 6-32643 A | 2/1994 |
| JP | 6-56496 A | 3/1994 |
| JP | 6-321602 A | 11/1994 |
| JP | 6-329457 | 11/1994 |
| JP | 07-291707 A | 11/1995 |
| JP | 7-291763 A | 11/1995 |
| JP | 08-040758 A | 2/1996 |
| JP | 9-87001 A | 3/1997 |
| JP | 10-231161 A | 9/1998 |
| JP | 11-322395 | 11/1999 |
| JP | 2000-264701 | 9/2000 |
| JP | 2001-158678 A | 6/2001 |
| JP | 2001-233653 A | 8/2001 |
| JP | 2001-287980 | 10/2001 |

(Continued)

OTHER PUBLICATIONS

JP 729107 A (Kubota KK teramoto Hiroshi) Nov. 7, 1995 abstract. See IDS See IDS submitted by applicants for their related U.S. Appl. No. 11/410,311 Utagaki.*
JP 8040758 A (Asahi Glass Co-Yada Akira) Feb. 13, 1996 abstract See IDS submitted by applicants in U.S. Appl. No. 11/410,311.*
JP 49045934 A (Kuraray) May 2, 1974 abstract. See this document submitted with applicants in U.S. Appl. No. 11/410,311.*
JP 49045935 A (Kuraray) abstract May 1974 See this document submitted with applicants in U.S. Appl. No. 11/410,311.*

(Continued)

Primary Examiner — Paul Marcantoni
(74) Attorney, Agent, or Firm — Birch, Stewart, Kolasch & Birch, LLP

(57) ABSTRACT

A fiber reinforced cement composition having the following raw material composition is provided to manufacture a fiber reinforced cement product which is excellent in bending strength, dimension stability, handling property, flexibility performance, and processability such as nail performance, as well as to provide a process for manufacturing the product.

Namely, the fiber reinforced cement composition comprises a hydraulic inorganic material, a siliceous material and a woody reinforcement in a mass ratio of CaO to $SiO_2$ contained in the hydraulic inorganic material and the siliceous material in the raw materials in a range of from 23:77 to 60:40.

22 Claims, No Drawings

FOREIGN PATENT DOCUMENTS

| | | |
|---|---|---|
| JP | 3245487 | 10/2001 |
| JP | 2002-166406 | 6/2002 |
| JP | 2003-146731 A | 5/2003 |
| JP | 2004-196601 A | 7/2004 |
| WO | WO 2006/025331 A1 | 3/2006 |

OTHER PUBLICATIONS

Japanese Office Action issued on Jan. 12, 2010 in related JP Application No. 2004-251708.
Third-Party Submission document filed on Jan. 4, 2010 in related Japanese Patent Application No. 2004-251708.
Third-Party Submission document filed on Jan. 5, 2010 in related Japanese Patent Application No. 2004-251706.
Third-Party Submission document filed on Jan. 5, 2010 in related Japanese Patent Application No. 2004-251707.
Third-Party Submission Notice issued on Jan. 28, 2010 in related Japanese Patent Application No. 2004-251708.
Third-Party Submission Notice issued on Jan. 29, 2010 in related Japanese Patent Application No. 2004-251706.
Third-Party Submission Notice issued on Jan. 29, 2010 in related Japanese Patent Application No. 2004-251707.

* cited by examiner

FIBER REINFORCED CEMENT COMPOSITION AND PRODUCTS AND MANUFACTURING PROCESS

CROSS-REFERENCE TO RELATED APPLICATION

PCT/JP2005/015667
U.S. patent application Ser. No. 11/215,964

BACKGROUND OF THE INVENTION

1. Field of the Invention

The present invention relates to a fiber reinforced cement composition using a hydraulic inorganic material such as cement, products thereof and a manufacturing process thereof.

2. Description of the Related Art

Hitherto, asbestos has been used as a reinforcing material of fiber reinforced cement products. Recently, however, woody reinforcements such as wood flakes and wood fibers have come to be used instead of conventional asbestos since environmental pollution (such as pneumoconiosis) caused by flying of fine powder of asbestos has become a serious problem.

However, fiber reinforced cement products reinforced with woody reinforcements have many problems in regard to dimension stability, handling performance and bending strength.

Thus, a special woody reinforcement such as needle-leaves-tree pulp has recently been used as the woody reinforcement, and various cement additives have been studied in order to activate development of strength not only via a hydration reaction of cement but also via a reaction between a silicate component and a calcium component.

For example, JP-3245487 B and JP4-187552 A disclose adding a specified amount of a polyvinyl alcohol resin powder to a hydraulic composition; JP2001-287980 A discloses adding a polyvinyl alcohol having specific physical properties; JP11-322395 A discloses adding a silicate having a specified Blaine value; JP6-329457 A discloses adding mica powder to a hydraulic composition; JP5-124845 A discloses adding mica coated with a polyvinyl alcohol resin; JP2002-166406 A discloses adding a specific mica; and JP2000-264701 A discloses adding a specific fiber and a specific inorganic foam.

Incidentally, the Blaine value represents fineness of a powder and refers to a specific area measured by a permeability method (Blaine permeability method).

SUMMARY OF THE INVENTION

Under such circumstances, the problems to be solved by the invention are to provide a fiber reinforced cement composition for obtaining a fiber reinforced cement product which is excellent in bending strength, dimension stability, handling property, flexibility performance, and processability such as nail performance, as well as a process for manufacturing the product.

The present invention provides, as a means to solve the conventional problems, a fiber reinforced cement composition comprising the following raw materials: a hydraulic inorganic material, a siliceous material and a woody reinforcement, wherein the mass ratio of CaO to $SiO_2$ ($CaO:SiO_2$) contained in the hydraulic inorganic material and the siliceous material in the raw materials is in a range of from 23:77 to 60:40.

Since the mass ratio of CaO to $SiO_2$ contained in the hydraulic inorganic material and the siliceous material in the raw materials is in a range of from 23:77 to 60:40 in the fiber reinforced cement composition according to the present invention, it is possible to provide, as the effects of the present invention, a fiber reinforced cement product having good bending strength, dimension stability, handling property, flexibility performance, nail performance and the like.

DETAILED DESCRIPTION OF THE INVENTION

The present invention will be explained in detail below.

At first, each of the raw materials of the fiber reinforced cement composition is explained below.

[Hydraulic Inorganic Material]

A hydraulic inorganic material refers to a material which causes a hydration reaction upon contact with water to initiate hardening and includes cement and lime.

Among them, it is preferred to use Portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for Portland Cement Type I, Type II, Type III, Type IV and Type V) are included. Amongst, ordinary portland cement (according to ASTM C150, Type I, Type II or a blend thereof, and according to AASHTO (American Association of State Highway and Transportation Officials) M85, Type I) is inexpensive and is suitable for the use.

Table 1

Table 1 shows, as an example, the analytical values of the chemical composition of the portland cement used in the present invention and the physical values of the cement.

[Siliceous Material]

A siliceous material refers to a material which contains silica ($SiO_2$) as a chemical component.

In the present invention, examples of the siliceous material include silica sand, silica powder, diatomaceous earth, silica fume, fly ash, bottom ash, blast furnace slag, steel slag and sodium silicate. It is preferable in the present invention to use at least one of silica sand, silica fume, fly ash, blast furnace slag, perlite powder and glass powder.

It is preferable that the silica sand contains not less than 98% by mass of $SiO_2$ component.

It is preferable that the silica fume contains not less than 97% by mass of $SiO_2$ component.

It is preferable that the fly ash contains not less than 50% by mass and not more than 70% by mass of $SiO_2$ component.

It is preferable that the blast furnace slag contains not less than 20% by mass and not more than 40% by mass of $SiO_2$ component.

Siliceous lightweight substances such as expanded perlite and shirasu balloons may be used as the siliceous material.

It is preferable in the present invention that the silica in the siliceous material is amorphous.

This is because a possibility of adverse effects (such as pneumoconiosis) of crystalline silica on a human body has been pointed out, just like asbestos cases.

It is possible to judge whether or not silica is crystalline by the appearance of the crystalline peaks of crystalline silica contained in quartz, tridymite or cristobalite by an X-ray diffraction.

Namely, quartz is crystalline and thus if the peaks of quartz are observed in a siliceous material, the silica component contained in the siliceous material is crystalline rather than amorphous.

Accordingly, such a siliceous material in which the peaks observed in quartz or the like in an X-ray diffraction are not observed is used in the present invention.

When fly ash is used as the siliceous material, while fly ash is very inexpensive and thus economical and, in addition, the resulting product such as an exterior wall board is excellent in nail performance because the shape of fly ash is spherical, it has a low specific gravity compared with silica sand. Thus the resulting product is inevitably low in specific gravity.

Thus, by replacing a part of the fly ash component with silica fume, specifically, replacing not less than 3% by mass and not more than 7% by mass of fly ash with silica fume, it is possible to obtain a fiber reinforced cement product having a high strength, good flexibility performance and good nail performance without largely increasing the cost and without lowering the specific gravity of the product.

In addition, by finely dividing fly ash into a particle size of not more than 15 μm, the reaction activity is enhanced. Thus a major part of the trace amount of crystalline silica contained in the fly ash is converted to calcium silicate hydrates and crystalline silica almost disappears.

Thus, by using finely divided fly ash and silica fume, it is possible to eliminate, subsequent to asbestos, a recent concern about the health issue (such as oncogenesis) caused by crystalline silica.

When a blast furnace slag is used as the siliceous material, there is no worry about health issue because blast furnace slag is amorphous. By replacing not less than 5% by mass and not more than 20% by mass of blast furnace slag with silica fume, a fiber reinforced cement product having a high strength and good flexibility performance can be obtained.

The reason why the replacement with silica fume of blast furnace slag is larger than that of fly ash is that the $SiO_2$ component contained in blast furnace slag is less than that contained in fly ash.

A major part of silica fume is also amorphous. Although silica fume contains crystobalite in a very small amount depending on the type, it has a high Blaine value and a high activity, and thus crystalline silica disappears via a hydrothermal reaction.

In addition, it is possible to use blast furnace slag and fly ash in combination as the siliceous material.

In this case, not less than 30% by mass and not more than 70% by mass of blast furnace slag is optionally replaced with fly ash in compliance with a desired specific gravity.

Glass powder is glassy and the content of silica varies depending on the type. By using a kind of glass powder having a high silica content, an aimed performance of the resulting base material can be obtained.

Perlite is composed mainly of glassy substances and the silicate content thereof is as high as about 80%. If it is pulverized for use, an aimed performance of the resulting base material can be obtained.

Table 2

Table 2 shows, as an example, the analytical value of the chemical composition of each of the silica sand and silica fume used in the present invention.

Table 3

Table 3 shows, as an example, the analytical value of the chemical composition of each of the fly ash and blast furnace slag used in the present invention.

[Woody Reinforcement]

Examples of the woody reinforcement include woody pulp, wood fiber bundle, wood flake, wood wool and wood powder. It is preferable to use woody pulp, more preferably needle-leaves-tree unbleached kraft pulp (NUKP), needle-leaves-tree bleached kraft pulp (NBKP), Laubholz unbleached kraft pulp (LUKP) and Laubholz bleached kraft pulp (LBKP), and particularly preferably needle-leaves tree pulps such as NUKP and NBKP.

It is preferable to set the freeness of a pulp, i.e. the value measured according to Canadian standard measurement (Canadian standard freeness, hereinafter, referred to as CSF), which varies depending on the degree of beating of pulp, to be not more than 500 ml.

By using such a woody reinforcement of fine fibers, the woody reinforcement exists in a cement (powder) matrix in a high density to give a fiber reinforced cement product having an excellent toughness.

Furthermore, it is possible to reduce the cost by using additionally used paper as the woody reinforcement.

It is preferable to use used newspapers or corrugated cardboards as the used paper.

By adding the used paper in an appropriate amount, mixing property with cement (powder) is enhanced, thereby providing a fiber reinforced cement product excellent in handling property and nail performance.

It is preferable to use the used paper having a fiber length of not less than 0.5 mm and not more than 3.0 mm, a fiber diameter of not less than 10 μm and not more than 100 μm, and a CSF of not more than 350 ml.

It is also preferable to use two kinds of woody reinforcement in a ratio of NUKP (NBKP) to used paper in a range of from 4:1 to 1:1.

If the ratio of the used paper to NUKP (NBKP) is more than 1:1, the resulting product contains a small amount of long fibers and thus becomes difficult to develop strength, whereas if the ratio of NUKP (NBKP) to used paper is more than 4:1, mixing with cement (powder) becomes difficult.

A woody reinforcement having a CSF of not less than 500 ml may be added as an auxiliary material.

[Mica]

Mica contributes to dimension stability of the product since it usually has a lamellar structure, is not hygroscopic and is a high elastic substance having a rigidity.

For example, if the product without mica contains 15 to 18% by mass of water when it is sold, the size of the product tends to shrink as the water content thereof decreases upon natural evaporation of the internal water under environmental conditions. However, if the product contains mica, the dimension change is reduced.

The mica used in the present invention is preferably flakes having an average particle size of not less than 200 μm and not more than 700 μm, and an aspect ratio of not less than 60 and not more than 100.

Incidentally, the aspect ratio herein means the ratio of thickness relative to particle size.

[Water-Soluble Resin]

Examples of the water-soluble resin include polyvinyl alcohols, carboxymethyl cellulose, methyl cellulose, polyethylene oxides and polyvinyl ethers.

The water-soluble resin serves as a binder in the fiber reinforced cement product, enhances adhesion between the layers of the components contained in the product, and improves the strength, as well as freezing and fusion resistance of the product.

In addition, since the water-soluble resin has a water-retention action, it prevents the surface of the fiber reinforced cement composition from drying in the course of autoclave curing and acts to uniform the water content, thereby achieving a uniform hardening-curing reaction.

Desirable water-soluble resins are powdery polyvinyl alcohol resins having a saponification value of not less than 98% by mol.

Incidentally, the term "saponification value" means a percentage of the number of hydroxyl group relative to the total number of acetate group and hydroxyl group contained in a polyvinyl alcohol resin in a saponification reaction (a reaction to synthesize a polyvinyl alcohol resin by substituting the acetate group in a polyvinyl acetate with hydroxyl group).

A powdery polyvinyl alcohol resin having a saponification value of not less than 98% by mol is not soluble in water but merely swells at a normal temperature, and thus does not dissolve in the water of an aqueous slurry of raw materials at a normal temperature. Therefore, in the after-mentioned process for forming a green sheet from slurry, outflow of a polyvinyl alcohol resin is reduced, whereby the process yield does not lower, and the viscosity of the slurry does not raise, whereby the process efficacy does not lower.

In the sheet prepared by forming a slurry of raw materials, the powdery polyvinyl alcohol resin comes to dissolve in the water contained in the green sheet owing to the high temperature in an autoclave curing process. Because the water content of the green sheet is low, a major part of the powdery polyvinyl alcohol resin remains in the green sheet in a balloon state in which the powdery polyvinyl alcohol resin is dissolved in water and a large amount of the polyvinyl alcohol resin in the balloon state exists in the final product, fiber reinforced cement product. Thus the product is provided with a cushioning property due to the effect of the shape of the balloon, whereby the internal stress which generates during freezing and fusion is absorbed and alleviated to enhance freezing and fusion resistance.

In addition, when a water-soluble resin is added, the water-soluble resin coats the surface of the particles of cement as a protecting colloid, which possibly affects the hydration reaction of the cement. However, when a powdery polyvinyl alcohol resin is used, a major part of the resin remains in a state of balloon in the green sheet. Thus it becomes difficult to coat the cement particles with the polyvinyl alcohol resin as a protecting colloid, whereby the effect of the resin on the hydration reaction of the cement is reduced.

[Other Component]

As the other components, the following components may be optionally added: mineral powders such as vermiculite, bentonite and dolomite; inorganic fibers such as wollastonite and glass fiber; organic fibers such as polypropylene fiber, acryl fiber and aramid fiber; cement setting accelerators such as sodium aluminate, calcium formate, potassium sulfate, calcium sulfate, aluminum sulfate and calcium acetate; water-repellants or water-proofing agents such as wax, paraffin, silicone and surfactants; and pulverized waste materials such as pulverized woody cement boards and inorganic boards.

Incidentally, these illustrations do not restrict the present invention.

Next, the composition of the raw materials for the above-mentioned fiber reinforced cement composition is explained.

[Raw Material Composition of the Fiber Reinforced Cement Composition]

The fiber reinforced cement composition is composed of the following raw materials.

A hydraulic inorganic material, a siliceous material and a woody reinforcement are mixed, wherein the mass ratio of the CaO to $SiO_2$ ($CaO:SiO_2$) in the combined materials of the hydraulic inorganic material and the siliceous material is set to be in a range of from 23:77 to 60:40.

It is possible to set the mass ratio of CaO to $SiO_2$ to be in a range of from 23:77 to 60:40 by analyzing the chemical composition each of the hydraulic inorganic material and the siliceous material.

For example, if the ordinary portland cement shown in Table 1 ($SiO_2$: 20.5% by mass, $Al_2O_3$: 4.3% by mass, $Fe_2O_3$: 2.7% by mass, CaO: 63.7% by mass, MgO: 2.6% by mass, $SO_3$: 2.8% by mass) is used as the hydraulic inorganic material in an amount of 30% by mass of the whole solid content, and, as the siliceous material, the silica fume shown in Table 2 ($SiO_2$: 98.0% by mass, $Al_2O_3$: 0.23% by mass, $Fe_2O_3$: 0.62% by mass, CaO: 0.07% by mass, MgO: 0.36% by mass, $SO_3$: 0.09% by mass) is used in an amount of 3% by mass of the whole solid content and the fly ash shown in Table 3 ($SiO_2$: 56.8% by mass, $Al_2O_3$: 28.5% by mass, $Fe_2O_3$: 7.3% by mass, CaO: 1.4% bymass, MgO: 0.96% bymass, $SO_3$: 0.46% bymass) is used in an amount of 53% by mass of the whole solid content, the content of CaO is calculated to be 19.854 ($30 \times 0.637 + 3 \times 0.0007 + 53 \times 0.014 = 19.854$) and the content of $SiO_2$ is calculated to be 39.314 ($30 \times 0.205 + 3 \times 0.98 + 53 \times 0.568 = 39.314$), whereby the ratio $CaO:SiO_2$ is $19.854:39.314 \approx 34:66$.

As another example, if the ordinary portland cement shown in Table 1 ($SiO_2$: 20.5% by mass, $Al_2O_3$: 4.3% by mass, $Fe_2O_3$: 2.7% by mass, CaO: 63.7% by mass, MgO: 2.6% by mass, $SO_3$: 2.8% by mass) is used as the hydraulic inorganic material in an amount of 30% by mass of the whole solid content, and, as the siliceous material, the fly ash shown in Table 3 ($SiO_2$: 56.8% by mass, $Al_2O_3$: 28.5% by mass, $Fe_2O_3$: 7.3% by mass, CaO: 1.4% by mass, MgO: 0.96% by mass, $SO_3$: 0.46% by mass) is used in an amount of 28.0% by mass of the whole solid content and the blast furnace slag shown in Table 3 ($SiO_2$: 33.1% by mass, $Al_2O_3$: 13.7% by mass, $Fe_2O_3$: 0.23% by mass, CaO: 43.0% by mass, MgO: 5.5% by mass, $SO_3$: 2.0% by mass) is used in an amount of 28.0% by mass of the whole solid content, the content of CaO is calculated to be 31.542 ($30 \times 0.637 + 28 \times 0.014 + 28 \times 0.43 = 31.542$) and the content of $SiO_2$ is calculated to be 31.322 ($30 \times 0.205 + 28 \times 0.568 + 28 \times 0.331 = 31.322$), whereby themass ratio $CaO:SiO_2$ is $31.542:31.332 \approx 50:50$.

A particularly mass ratio is obtained by using as the hydraulic inorganic material not less than 28% by mass and not more than 32% by mass of ordinary portland cement, and as the siliceous material not less than 54% by mass and not more than 58% by mass in total of fly ash and silica fume, wherein the amount of the silica fume is not less than 3% by mass and not more than 7% by mass of the whole siliceous material consisting of the fly ash and the silica fume. In this case, the mass ratio $Cao:SiO_2$ is in a range of from 30:70 to 40:60.

Another preferable mass ratio is obtained by using as the hydraulic inorganic material not less than 28% by mass and not more than 32% by mass of ordinary portland cement, and as the siliceous material not less than 54% by mass and not more than 58% by mass in total of blast furnace slag and silica fume, wherein the amount of the silica fume is not less than 5% by mass and not more than 20% by mass of the whole siliceous material consisting of the blast furnace slag and the silica fume. In this case, the mass ratio $Cao:SiO_2$ is in a range of from 50:50 to 60:40.

Another preferable mass ratio is obtained by using as the hydraulic inorganic material not less than 28% by mass and not more than 32% by mass of ordinary portland cement, and as the siliceous material not less than 54% by mass and not more than 58% by mass in total of fly ash and blast furnace slag, wherein the amount of the fly ash is not less than 30% by mass and not more than 70% by mass of the whole siliceous material consisting of the fly ash and the blast furnace slag. In this case, the mass ratio $CaO:SiO_2$ is in a range of from 40:60 to 60:40.

Furthermore, another preferable mass ratio is obtained by using as the hydraulic inorganic material not less than 28% by mass and not more than 32% by mass of ordinary portland cement, and as the siliceous material not less than 54% by mass and not more than 58% by mass in total of the silica sand and the silica fume. In this case, the mass ratio $CaO:SiO_2$ is in a range of from 23:77 to 35:65.

It is preferable to add as the raw materials of the fiber reinforced cement composition not less than 25% by mass and not more than 45% by mass of the hydraulic inorganic material, not less than 50% by mass and not more than 65% by mass of the siliceous material, not less than 5% by mass and not more than 12% by mass of the woody reinforcement, not less than 1% by mass and not more than 7% by mass of mica, and not less than 0.25% by mass and not more than 1.5% by mass of a water-soluble resin.

If the amount of the hydraulic inorganic material is less than 25% by mass, development of the strength after first hardening is not sufficient, whereas if it is more than 45% by mass, the resulting product becomes rigid and fragile.

If the amount of the siliceous material is less than 50% by mass, a silica component which reacts in a calcium silicate reaction is not enough, whereas if it is more than 65% by mass, a calcium component is not enough to leave an unreacted silica component.

An optimal ratio for the reaction between the hydraulic inorganic material and the siliceous material, particularly for developing strength via a cement hydration reaction and via a calcium silicate reaction is as mentioned above.

If the amount of the woody reinforcement is less than 5% by mass, a problem with regard to toughness of the product occurs, whereas if it is more than 12% by mass, uniform dispersion thereof in the raw materials becomes difficult.

If the amount of mica is less than 1% by mass, it does not contribute to the dimension stability of the resulting fiber reinforced cement product, whereas if it is more than 7% by mass, uniform dispersion thereof in the raw materials becomes difficult.

If the amount of the water-soluble resin is less than 0.25% by mass, it does not contribute to the development of strength, whereas if it is more than 1.5% by mass, improvement in the physical properties of the resulting product is not achieved.

The raw materials of a preferred fiber reinforced cement composition comprise not less than 28% by mass and not more than 32% by mass of portland cement as the hydraulic inorganic material, not less than 54% by mass and not more than 58% by mass in total of fly ash and silica fume as the siliceous material, wherein the amount of the silica fume is not less than 3% by mass and not more than 7% by mass of the whole siliceous material consisting of the fly ash and the silica fume, not less than 8% by mass and not more than 12% by mass in total of NUKP and/or NBKP and used paper as the woody reinforcement, wherein the amount of the used paper is not less than 20% by mass and not more than 50% by mass of the whole woody reinforcement consisting of the NUKP and/or NBKP and the used paper, not less than 2% by mass and not more than 5% by mass of mica, and not less than 0.5% by mass and not more than 1.25% by mass of a water-soluble resin, wherein the mass ratio of CaO to $SiO_2$ in the raw materials consisting of the hydraulic inorganic material and the siliceous material is in a range of from 30:70 to 40:60.

The raw materials of another preferred fiber reinforced cement composition comprise not less than 28% by mass and not more than 32% by mass of portland cement as the hydraulic inorganic material, not less than 54% by mass and not more than 58% by mass in total of blast furnace slag and silica fume as the siliceous material, wherein the amount of the silica fume is not less than 5% by mass and not more than 20% by mass of the whole siliceous material consisting of the blast furnace slag and the silica fume, not less than 8% by mass and not more than 12% by mass in total of NUKP and/or NBKP and used paper as the woody reinforcement, wherein the amount of the used paper is not less than 20% by mass and not more than 50% by mass of the whole woody reinforcement consisting of the NUKP and/or NBKP and the used paper, not less than 2% by mass and not more than 5% by mass of mica, and not less than 0.5% by mass and not more than 1.25% by mass of a water-soluble resin, wherein the mass ratio of CaO to $SiO_2$ in the raw materials consisting of the hydraulic inorganic material and the siliceous material is in a range of from 50:50 to 60:40.

Further, the raw materials of another preferred fiber reinforced cement composition comprise not less than 28% by mass and not more than 32% by mass of portland cement as the hydraulic inorganic material, not less than 54% by mass and not more than 58% by mass in total of fly ash and blast furnace slag as the siliceous material, wherein the amount of the fly ash is not less than 30% by mass and not more than 70% by mass of the whole siliceous material consisting of the fly ash and the blast furnace slag, not less than 8% by mass and not more than 12% by mass in total of NUKP and/or NBKP and used paper as the woody reinforcement, wherein the amount of the used paper is not less than 20% by mass and not more than 50% by mass of the whole woody reinforcement consisting of the NUKP and/or NBKP and the used paper, not less than 2% by mass and not more than 5% by mass of mica, and not less than 0.5% by mass and not more than 1.25% by mass of a water-soluble resin, wherein the mass ratio of CaO to $SiO_2$ in the raw materials consisting of the hydraulic inorganic material and the siliceous material is in a range of from 40:60 to 60:40.

Still further, the raw materials of another preferred fiber reinforced cement composition comprise not less than 28% by mass and not more than 32% by mass of portland cement as the hydraulic inorganic material, not less than 54% by mass and not more than 58% by mass in total of silica sand and silica fume as the siliceous material, not less than 8% by mass and not more than 12% by mass in total of NUKP and/or NBKP and used paper as the woody reinforcement, wherein the amount of the used paper is not less than 20% by mass and not more than 50% by mass of the whole woody reinforcement consisting of the NUKP and/or NBKP and the used paper, not less than 2% by mass and not more than 5% by mass of mica, and not less than 0.5% by mass and not more than 1.25% by mass of a water-soluble resin, wherein the mass ratio of CaO to $SiO_2$ in the raw materials consisting of the hydraulic inorganic material and the siliceous material is in a range of from 23:77 to 35:65.

A process for manufacturing a fiber reinforced cement product is explained below.

[Manufacturing Process]

In a process for manufacturing a fiber reinforced cement product, the above-mentioned composition is mixed with water to give a slurry of raw materials.

The concentration of the slurry is in a range of from 3 to 15% by mass reduced to a concentration of solid content.

It is desirable to add silica fume in the form of slurry obtained by mixing it with water with stirring rather than in the form of powder, with the slurry having a concentration of approximately 30% by mass being most readily handled.

The slurry of raw materials is manufactured by a wet process.

Examples of the wet manufacturing processes include Hatschek process, flow on process, filter pressing process, roll forming, extrusion, injection, Mazza pipe process, Magnani sheet process, hand lay-up process, molding and casting. Flow on process is employed for paper making herein.

Namely, the slurry of raw materials is flown down on a felt and dehydrated while forming to give a green sheet (i.e. a soft wet sheet), and the green sheet is rolled up around a making roll to give a multi-layer sheet. When the thickness of the multi-layer sheet reaches a predetermined thickness, the sheet is removed from the making roll to give a green mat.

The number of rolling around the making roll is preferably 6 to 15.

Then, the mat is pressed with a pressure of 2 to 5 MPa.

The sheet is rolled up around the making roll in layers in Hatschek process like in flow-on process. In the case where Hatschek process is employed, plural vessels each accommodating a cylinder are provided and a felt is run on the cylinders in the vessels to transfer the raw materials to the felt. Thus the screened sheet which was screened and dehydrated on the felt and rolled up around the making roll has a laminar structure having the number of layers equivalent to the number of the vessel and has a freezing and fusion resistance inferior to that of a sheet obtained by the flow-on process.

On the contrary, when the flow-on process is employed, the resulting green sheet itself does not have a laminar structure but the resulting green mat has a laminar structure having the number of layers equivalent to the number of rolling up around the making roll and thus has a freezing and fusion resistance better than that of the mat obtained by the Hatschek process.

Therefore, it is preferable to adopt the flow-on process.

The pressed mat obtained by pressing the green mat is hardened at 40 to 80° C. for 12 to 24 hours and then cured in an autoclave.

Curing in an autoclave is preferably effected by raising the temperature to 150 to 180° C. in 3.5 hours, keeping the temperature for 6.5 hours and lowering the temperature in 6 hours.

Upon autoclave curing under such conditions, a silica component and an alumina component elute from the surface of mica, thereby roughening the surface of mica.

In addition, the calcium component eluted from cement or the like is liable to enter into the space among overlapped parts of mica fragments, and the calcium component reacts with the silica component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure which has a better crystalline property than that of the other kind of tobermorite is produced in a large amount, thereby enhancing the dimension stability, as well as the freezing and fusion resistance of the product.

If the amount of the calcium component is too much relative to the amount of the silica component, a cement hydration predominantly occurs rather than a calcium silicate reaction, whereby the product becomes fragile and the crack resistance lowers.

On the contrary, if the amount of the silica component is too much relative to the amount of the calcium component, unreacted silica component remains in a large amount and the amount of tobermorite produced is decreased, thereby lowering the freezing and fusion resistance of the product.

[Product]

Application of the fiber reinforced cement composition includes fiber reinforced cement sidings, glass fiber reinforced cement boards, pulp reinforced cement boards, wood fiber reinforced cement calcium silicate boards, fiber reinforced cement calcium silicate boards, slag cement perlite boards and the like, and all of these final products are referred to as fiber reinforced cement products.

[Coating Method]

Coating of the fiber reinforced cement product is effected, for example, by coating with a sealer the front face two times and the ends and the rear face once, applying an undercoating such as an aqueous emulsion type acryl resin paint or a silicone resin paint, applying an intermediate coating, and then applying a top coating such as an organic solvent solution type acryl resin paint, an aqueous emulsion type acryl resin paint or an organic solvent solution type silicone acryl resin paint.

Next, a method for installation of the fiber reinforced cement product is explained.

[Installation Method]

As a method for installation of the product of the fiber reinforced cement composition, it is preferable to effect, for example, in the case of fiber reinforced cement sidings, by nailing a first siding at the positions about 20 mm inside from the upper edge thereof, placing a second siding in such a manner that the lower edge of the second siding overlaps the upper edge of the first siding by not less than 30 mm, and then nailing the second siding at the positions about 20 mm inside from the upper edge thereof according to a so-called lap boarding.

Description of the Preferred Embodiments

Embodiment 1

An example of the present invention will be illustrated by Embodiment 1.

Table 4

Table 4 shows the compositions of the raw materials in Examples 1-10 according to the present invention.

The raw materials are mixed in the formulation ratio shown in the table, and water is added thereto to give a slurry of raw material having a solid concentration of 10% by mass. The slurry is caused to flow down on a felt and dehydrated with forming to give a green sheet. The green sheet is rolled up around a making roll to have a multilayer structure. When the thickness of the sheet reaches a predetermined value, the sheet is separated from the making roll to give a green mat. The mat is pressed with a pressure of 5 MPa, hardened at 80° C. for 15 hours, and further cured in an autoclave at 170° C. for 7 hours to provide a sample of fiber reinforced cement product.

Table 5

Table 5 shows physical properties of the products of Examples 1-10 according to the present invention.

Bending strength and young's modulus were measured using a test piece of 500×400 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the piece at 20° C. under RH of 60% for 10 days and then drying it at 80° C. for 10 days to allow moisture effusion.

Microcracking test (cycle) means the number of cycle until cracks occur, wherein one cycle consists of a water absorption-drying procedure repeated 3 times in one week, said procedure consisting of neutralization for 4 days, water absorption for 7 hours and drying at 120° C. for 17 hours.

Freezing and fusion resistance is a percentage of expansion in thickness after 300 cycles according to ASTM C166-B method.

Nailing performance is determined by observing generation of cracks when two fiber reinforced cement products which are laid to overlap with each other by 30 mm according to the lap boarding are pegged with nails of 2.3 mm in diameter and 38 mm in length by means of a nailer gun at the positions of the overlapped part of the products 20 mm inside from the edges of the overlapped part in the longitudinal direction and in the shorter direction in compliance with actual installation. The mark "○" denotes no cracking and the mark "×" denotes generation of cracks.

Presence or absence of crystalline silica was determined by appearance of the peaks observed in crystalline silica such as quartz, tridymite or cristobalite in an X-ray diffraction.

EXAMPLE 1

The fiber reinforced cement product of Example 1, in which the CaO to $SiO_2$ ratio is 24:76 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.27, a bending strength of 21.5 $N/mm^2$, an elongation ratio through water absorption of 0.14%, a contraction ratio through moisture effusion of 0.14%, the number of cycle of 7 in the microcracking test and a freezing and fusion resistance of 0.5%, and the nail performance thereof is "○". Thus the product is good in bending strength, dimension stability, freezing and fusion resistance and nail performance.

EXAMPLE 2

The fiber reinforced cement product of Example 2, in which the CaO to $SiO_2$ ratio is 34:66 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.25, a bending strength of 20.2 $N/mm^2$, an elongation ratio through water absorption of 0.14%, a contraction ratio through moisture effusion of 0.16%, the number of cycle of 6 in the microcracking test and a freezing and fusion resistance of 0.7%, and the nail performance thereof is "○". Thus the product is good in bending strength, dimension stability, freezing and fusion resistance and nail performance. In addition, since fly ash and silica fume are used as the siliceous material, the product scarcely contains crystalline silica.

EXAMPLE 3

The fiber reinforced cement product of Example 3, in which the CaO to $SiO_2$ ratio is 51:49 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.25, a bending strength of 21.2 $N/mm^2$, an elongation ratio through water absorption of 0.15%, a contraction ratio through moisture effusion of 0.14%, the number of cycle of 7 in the microcracking test and a freezing and fusion resistance of 0.5%, and the nail performance thereof is "○". Thus the product is good in bending strength, dimension stability, freezing and fusion resistance and nail performance. In addition, since blast furnace slag and silica fume are used as the siliceous material, the product scarcely contains crystalline silica.

EXAMPLE 4

The fiber reinforced cement product of Example 4, in which the CaO to $SiO_2$ ratio is 25:75 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.25, a bending strength of 21.5 $N/mm^2$, an elongation ratio through water absorption of 0.14%, a contraction ratio through moisture effusion of 0.14%, the number of cycle of 7 in the microcracking test and a freezing and fusion resistance of 0.6%, and the nail performance thereof is "○". Thus the product is good in bending strength, dimension stability, freezing and fusion resistance and nail performance. In addition, since silica fume and perlite powder are used as the siliceous material, the product does not contain crystalline silica.

EXAMPLE 5

The fiber reinforced cement product of Example 5 in which the CaO to $SiO_2$ ratio is 25:75 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.23, a bending strength of 20.8 $N/mm^2$, an elongation ratio through water absorption of 0.15%, a contraction ratio through moisture effusion of 0.15%, the number of cycle of 7 in the microcracking test and a freezing and fusion resistance of 0.7%, and the nail performance thereof is "○". Thus the product is good in bending strength, dimension stability, freezing and fusion resistance and nail performance. In addition, since silica fume and glass powder are used as the siliceous material, the product does not contain crystalline silica.

EXAMPLE 6

The fiber reinforced cement product of Example 6, in which the CaO to $SiO_2$ ratio is 50:50 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.21, a bending strength of 20.3 N/mm², an elongation ratio through water absorption of 0.14%, a contraction ratio through moisture effusion of 0.15%, the number of cycle of 7 in the microcracking test and a freezing and fusion resistance of 0.7%, and the nail performance thereof is "○". Thus the product is good in bending strength, dimension stability, freezing and fusion resistance and nail performance. In addition, since blast furnace slag and fly ash are used as the siliceous material, the product scarcely contains crystalline silica.

EXAMPLE 7

The fiber reinforced cement product of Example 7, in which the CaO to $SiO_2$ ratio is 44:56 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.26, a bending strength of 22.4 N/mm², an elongation ratio through water absorption of 0.13%, a contraction ratio through moisture effusion of 0.14%, the number of cycle of 6 in the microcracking test and a freezing and fusion resistance of 0.4%, and the nail performance thereof is "○". Thus the product is good in bending strength, dimension stability, freezing and fusion resistance and nail performance. In addition, since blast furnace slag, fly ash and silica fume are used as the siliceous material, the product scarcely contains crystalline silica.

EXAMPLE 8

The fiber reinforced cement product of Example 8, in which the CaO to $SiO_2$ ratio is 40:60 (i.e. within the range of $CaO:SiO_2$ ratio of from 23:77 to 60:40), the amount of the hydraulic inorganic material is 30% by mass (i.e. within the range of from 25 to 45% by mass), the amount of the siliceous material is 56% by mass (i.e. within the range of from 50 to 65% by mass), and the amount of the woody reinforcement is 8% by mass (i.e. within the range of from 5 to 12% by mass), has an absolute dry specific gravity of 1.24, a bending strength of 21.2 N/mm², an elongation ratio through water absorption of 0.15%, a contraction ratio through moisture effusion of 0.14%, the number of cycle of 7 in the microcracking test and a freezing and fusion resistance of 0.6%, and the nail performance thereof is "○". Thus the product is good in bending strength, dimension stability, freezing and fusion resistance and nail performance. In addition, since blast furnace slag, fly ash and silica fume are used as the siliceous material, the product scarcely contains crystalline silica.

EXAMPLE 9

The fiber reinforced cement product of Example 9, in which the CaO to $SiO_2$ ratio is 23:77 (i.e. within the range of $CaO:SiO_2$ ratio of from 23:77 to 60:40), the amount of the hydraulic inorganic material is 28% by mass (i.e. within the range of from 25 to 45% by mass), the amount of the siliceous material is 58% by mass (i.e. within the range of from 50 to 65% by mass), and the amount of the woody reinforcement is 8% by mass (i.e. within the range of from 5 to 12% by mass), has an absolute dry specific gravity of 1.22, a bending strength of 20.0 N/mm², an elongation ratio through water absorption of 0.14%, a contraction ratio through moisture effusion of 0.13%, the number of cycle of 8 in the microcracking test and a freezing and fusion resistance of 0.8%, and the nail performance thereof is "○". Thus the product is good in bending strength, dimension stability, freezing and fusion resistance and nail performance.

EXAMPLE 10

The fiber reinforced cement product of Example 10, in which the CaO to $SiO_2$ ratio is 60:40 (i.e. within the range of $CaO:SiO_2$ ratio of from 23:77 to 60:40), the amount of the hydraulic inorganic material is 28% by mass (i.e. within the range of from 25 to 45% by mass), the amount of the siliceous material is 58% by mass (i.e. within the range of from 50 to 65% by mass), and the amount of the woody reinforcement is 8% by mass (i.e. within the range of from 5 to 12% by mass), has an absolute dry specific gravity of 1.22, a bending strength of 19.5 N/mm², an elongation ratio through water absorption of 0.14%, a contraction ratio through moisture effusion of 0.14%, the number of cycle of 8 in the microcracking test and a freezing and fusion resistance of 0.8%, and the nail performance thereof is "○". Thus the product is good in bending strength, dimension stability, freezing and fusion resistance and nail performance. In addition, since blast furnace slag and silica fume are used as the siliceous material, the product does not contain crystalline silica.

Embodiment 2

Comparisons referring to the present invention are illustrated as Embodiment 2.
Table 6
Table 6 shows the compositions of the raw materials of Comparisons 1 to 10 in which samples of fiber reinforced cement products were manufactured by a process similar to that in the examples.
Table 7
Table 7 shows various physical properties of the products of Comparisons 1 to 10 in which samples of fiber reinforced cement products were measured in a manner similar to that in the examples.
Comparison 1
The fiber reinforced cement product of Comparison 1, in which the CaO to $SiO_2$ ratio is 20:80 (i.e. not within the range of $CaO:SiO_2$ ratio of from 23:77 to 60:40), has a slightly low absolute dry specific gravity of 1.18 and a considerably poor freezing and fusion resistance of 2.6%.
Comparison 2
The fiber reinforced cement product of Comparison 2, in which the CaO to $SiO_2$ ratio is 65:35 (i.e. not within the range of $CaO:SiO_2$ ratio of from 23:77 to 60:40), has a slightly low bending strength of 15.7 N/mm² and a slightly poor freezing and fusion resistance of 1.2%.
Comparison 3
The fiber reinforced cement product of Comparison 3, in which the amount of the hydraulic inorganic material is 10% by mass (i.e. not within the range of from 25 to 45% by mass), has a considerably low bending strength of 12.1 N/mm² and a considerably poor freezing and fusion resistance of 5.9%.
Comparison 4
The fiber reinforced cement product of Comparison 4, in which the amount of the hydraulic inorganic material is 55% by mass (i.e. not within the range of from 25 to 45% by mass), has a considerably high absolute dry specific gravity of 1.55 and thus has a poor nail performance.

Comparison 5

The fiber reinforced cement product of Comparison 5, in which the amount of the siliceous material is 40% by mass (i.e. not within the range of from 50 to 65% by mass), has a slightly high absolute dry specific gravity of 1.38 and thus has a poor nail performance.

Comparison 6

The fiber reinforced cement product of Comparison 6, in which the amount of the siliceous material is 75% by mass (i.e. not within the range of from 50 to 65% by mass), has a slightly low absolute dry specific gravity of 1.17, a very low bending strength of 11.9 N/mm$^2$ and a considerably poor freezing and fusion resistance of 6.3%.

Comparison 7

The fiber reinforced cement product of Comparison 7, in which the amount of the woody reinforcement is 16% by mass (i.e. not within the range of from 5 to 12% by mass), has a very low absolute dry specific gravity of 0.97, a very low bending strength of 12.0 N/mm$^2$, a considerably bad elongation ratio through water absorption of 0.26%, a considerably bad contraction ratio through moisture effusion of 0.31% and a very poor freezing and fusion resistance of 9.5%.

Comparison 8

The fiber reinforced cement product of Comparison 8, in which the amount of the woody reinforcement is 4% by mass (i.e. not within the range of from 5 to 12% by mass), has a very high absolute dry specific gravity of 1.70 and thus is bad in nail performance, and has a slightly low bending strength of 13.2 N/mm$^2$.

Comparison 9

The fiber reinforced cement product of Comparison 9, in which the amount of mica is 10% by mass (i.e. not within the range of from 2 to 5% by mass), has a considerably low absolute dry specific gravity of 1.11, a considerably low bending strength of 12.3 N/mm$^2$, and a considerably poor freezing and fusion resistance of 5.5%.

Comparison 10

The fiber reinforced cement product of Comparison 10, in which the amount of a water-soluble resin is 5% by mass (i.e. not within the range of from 0.5 to 1.25% by mass), has a considerably low absolute dry specific gravity of 1.07, a considerably low bending strength of 12.1 N/mm$^2$, and a considerably poor freezing and fusion resistance of 4.1%.

TABLE 1

[LABORATORY TEST REPORT FOR PORTLAND CEMENT]

| Chemical Tests | Specification | |
|---|---|---|
| $SiO_2$ | 20.5(%) | |
| $Al_2O_3$ | 4.3 | 6.0 Max. |
| $Fe_2O_3$ | 2.7 | 6.0 Max. |
| CaO | 63.7 | |
| MgO | 2.6 | 6.0 Max. |
| $SO_3$ | 2.8 | 3.0 Max. |
| LOI | 1.6 | 3.0 Max. |
| $Na_2O$ | 0.27 | |
| $K_2O$ | 0.68 | |
| $Na_2O$ eq. | 0.71 | |
| Ins. Res. | 0.23 | 0.75 Max. |
| $C_3S$ | 63(%) | |
| $C_2S$ | 11 | |
| $C_3A$ | 7 | |
| $C_4AF$ | 8 | |

TABLE 1-continued

[LABORATORY TEST REPORT FOR PORTLAND CEMENT]

| Physical Tests | Specification | |
|---|---|---|
| Specific Gravity: | 3.15 | |
| Compressive Strengths—(psi) | | |
| 1 Day: | 2590 | |
| 3 Day: | 4030 | |
| 7 Day: | 4910 | |
| 28 Day: | 5990 | |
| Setting Time (Vicat)—(mins) | | |
| Initial: | 141 | 60 Min. |
| Final: | 246 | 600 Max. |
| False Set: | 81% | 50 Min. |
| Blaine: | 379 | 280 Min. |
| % 325 Mesh: | 96 | |
| % Expansion: | −0.01 | 0.80 Max. |
| % Air: | 8 | 12 Max. |

TABLE 2

[CHEMICAL TEST REPORT FOR SILICA FUME, SILICA SAND]

| Silica fume | Specification |
|---|---|
| $SiO_2$ | 98.0(%) |
| $Al_2O_3$ | 0.23 |
| $Fe_2O_3$ | 0.62 |
| CaO | 0.07 |
| MgO | 0.34 |
| $SO_3$ | 0.09 |
| $Na_2O$ | 0.22 |
| $K_2O$ | 0.37 |
| LOI | 1.10 |

| Silica sand | |
|---|---|
| $SiO_2$ | 98.5(%) |
| $Al_2O_3$ | 1.00 |
| $Fe_2O_3$ | 0.12 |
| CaO | 0.02 |
| MgO | 0.01 |
| $SO_3$ | 0.05 |
| $Na_2O$ | 0.07 |
| $K_2O$ | 0.03 |
| LOI | 0.13 |

TABLE 3

[CHEMICAL TEST REPORT FOR FLYASH, BLAST FURNACE SLAG]

| Flyash | Specification |
|---|---|
| $SiO_2$ | 56.8(%) |
| $Al_2O_3$ | 28.5 |
| $Fe_2O_3$ | 7.30 |
| CaO | 1.40 |
| MgO | 0.96 |
| $SO_3$ | 0.46 |
| $Na_2O$ | 0.36 |
| $K_2O$ | 2.40 |
| LOI | 2.60 |

| Blast furnace slag | |
|---|---|
| $SiO_2$ | 33.1(%) |
| $Al_2O_3$ | 13.7 |
| $Fe_2O_3$ | 0.23 |
| CaO | 43.0 |

TABLE 3-continued

[CHEMICAL TEST REPORT FOR FLYASH, BLAST FURNACE SLAG]

| | Specification |
|---|---|
| MgO | 5.50 |
| $SO_3$ | 2.00 |
| $Na_2O$ | |

TABLE 3-continued

[CHEMICAL TEST REPORT FOR FLYASH, BLAST FURNACE SLAG]

| | Specification |
|---|---|
| $K_2O$ | |
| LOI | 0.89 |

TABLE 4

| Raw material composition (% by mass) | Example 1 | Example 2 | Example 3 | Example 4 | Example 5 | Example 6 | Example 7 | Example 8 | Example 9 | Example 10 |
|---|---|---|---|---|---|---|---|---|---|---|
| Portland cement | 30 | 30 | 30 | 30 | 30 | 30 | 30 | 30 | 28 | 28 |
| Silica sand | 53 | 0 | 0 | 0 | 0 | 0 | 0 | 0 | 55 | 0 |
| Blast furnace slag | 0 | 0 | 46 | 0 | 0 | 28 | 20 | 12 | 0 | 54 |
| Fly ash | 0 | 53 | 0 | 0 | 0 | 28 | 31 | 39 | 0 | 0 |
| Silica fume | 3 | 3 | 10 | 3 | 3 | 0 | 5 | 5 | 3 | 4 |
| Perlite powder | 0 | 0 | 0 | 53 | 0 | 0 | 0 | 0 | 0 | 0 |
| Glass powder | 0 | 0 | 0 | 0 | 53 | 0 | 0 | 0 | 0 | 0 |
| NUKP | 8 | 0 | 4 | 8 | 8 | 8 | 8 | 8 | 8 | 8 |
| NBKP | 0 | 8 | 4 | 0 | 0 | 0 | 0 | 0 | 0 | 0 |
| Used newspaper | 2 | 2 | 2 | 2 | 2 | 2 | 2 | 2 | 2 | 2 |
| Mica | 3 | 3 | 3 | 3 | 3 | 3 | 3 | 3 | 3 | 3 |
| Polyvinyl alcohol resin | 1 | 1 | 1 | 1 | 1 | 1 | 1 | 1 | 1 | 1 |
| $CaO:SiO_2$ | 24:76 | 34:66 | 51:49 | 25:75 | 25:75 | 50:50 | 44:56 | 40:60 | 23:77 | 60:40 |

TABLE 5

| Physical property | Example 1 | Example 2 | Example 3 | Example 4 | Example 5 | Example 6 | Example 7 | Example 8 | Example 9 | Example 10 |
|---|---|---|---|---|---|---|---|---|---|---|
| Absolute dry specific gravity | 1.27 | 1.25 | 1.25 | 1.25 | 1.23 | 1.21 | 1.26 | 1.24 | 1.22 | 1.22 |
| Young's modulus ($kN/mm^2$) | 7.1 | 6.5 | 7.3 | 6.9 | 6.6 | 6.4 | 7.6 | 6.8 | 6.4 | 6.2 |
| Bending strength ($N/mm^2$) | 21.5 | 20.2 | 21.2 | 21.5 | 20.8 | 20.3 | 22.4 | 21.2 | 20.0 | 19.5 |
| Elongation ratio through water absorption (%) | 0.14 | 0.14 | 0.15 | 0.14 | 0.15 | 0.14 | 0.13 | 0.15 | 0.14 | 0.14 |
| Contraction ratio through moisture effusion (%) | 0.14 | 0.16 | 0.14 | 0.14 | 0.15 | 0.15 | 0.14 | 0.14 | 0.13 | 0.14 |
| Microcracking test (cycle) | 7 | 6 | 7 | 7 | 7 | 7 | 6 | 7 | 8 | 8 |
| Freezing and fusion resistance (%) | 0.5 | 0.7 | 0.5 | 0.6 | 0.7 | 0.7 | 0.4 | 0.6 | 0.8 | 0.8 |
| Nail performance | ○ | ○ | ○ | ○ | ○ | ○ | ○ | ○ | ○ | ○ |
| Presence or absence of crystalline silica | Present | Scarcely present | Not present | Not present | Not present | Scarcely present | Scarcely present | Scarcely present | Present | Not present |

TABLE 6

| Raw material composition (% by mass) | Comparison 1 | Comparison 2 | Comparison 3 | Comparison 4 | Comparison 5 | Comparison 6 | Comparison 7 | Comparison 8 | Comparison 9 | Comparison 10 |
|---|---|---|---|---|---|---|---|---|---|---|
| Portland cement | 25 | 36 | 10 | 55 | 46 | 11 | 28 | 32 | 30 | 30 |
| Silica sand | 58 | 0 | 0 | 28 | 40 | 75 | 0 | 0 | 46 | 47 |
| Blast furnace slag | 0 | 50 | 68 | 0 | 0 | 0 | 0 | 0 | 0 | 0 |
| Fly ash | 0 | 0 | 0 | 0 | 0 | 0 | 47 | 55 | 0 | 0 |
| Silica fume | 3 | 0 | 8 | 3 | 0 | 0 | 3 | 5 | 3 | 5 |
| Perlite powder | 0 | 0 | 0 | 0 | 0 | 0 | 0 | 0 | 0 | 0 |
| Glass powder | 0 | 0 | 0 | 0 | 0 | 0 | 0 | 0 | 0 | 0 |
| NUKP | 8 | 8 | 8 | 8 | 8 | 8 | 8 | 0 | 8 | 8 |
| NBKP | 0 | 0 | 0 | 0 | 0 | 0 | 8 | 4 | 0 | 0 |
| Used newspaper | 2 | 2 | 2 | 2 | 2 | 2 | 2 | 0 | 2 | 2 |
| Mica | 3 | 3 | 3 | 3 | 3 | 3 | 3 | 3 | 10 | 3 |
| Polyvinyl alcohol resin | 1 | 1 | 1 | 1 | 1 | 1 | 1 | 1 | 1 | 5 |
| $CaO:SiO_2$ | 20:80 | 65:35 | 52:48 | 46:54 | 38:62 | 8:92 | 34:66 | 33:67 | 26:74 | 25:75 |

TABLE 7

| Physical property | Comparison 1 | Comparison 2 | Comparison 3 | Comparison 4 | Comparison 5 | Comparison 6 | Comparison 7 | Comparison 8 | Comparison 9 | Comparison 10 |
|---|---|---|---|---|---|---|---|---|---|---|
| Absolute dry specific gravity | 1.18 | 1.33 | 1.26 | 1.55 | 1.38 | 1.17 | 0.97 | 1.70 | 1.11 | 1.07 |
| Young's modulus (kN/mm$^2$) | 5.5 | 7.0 | 5.6 | 9.3 | 8.2 | 5.8 | 3.9 | 11.5 | 4.5 | 4.2 |
| Bending strength (N/mm$^2$) | 17.3 | 15.7 | 12.1 | 16.8 | 19.1 | 11.9 | 12.0 | 13.2 | 12.3 | 12.1 |
| Elongation ratio through water absorption (%) | 0.17 | 0.14 | 0.15 | 0.15 | 0.16 | 0.15 | 0.26 | 0.10 | 0.14 | 0.15 |
| Contraction ratio through moisture effusion (%) | 0.18 | 0.14 | 0.15 | 0.17 | 0.17 | 0.15 | 0.31 | 0.11 | 0.13 | 0.14 |
| Microcracking test (cycle) | 8 | 6 | 6 | 1 | 2 | 6 | 7 | 1 | 8 | 8 |
| Freezing and fusion resistance (%) | 2.6 | 1.2 | 5.9 | 0.3 | 0.5 | 6.3 | 9.5 | 0.2 | 5.5 | 4.1 |
| Nail performance | ○ | ○ | ○ | X | X | ○ | ○ | X | ○ | ○ |
| Presence or absence of crystalline silica | Present | Not present | Not present | Present | Present | Present | Scarcely present | Scarcely present | Present | Present |

What is claimed is:

1. A fiber reinforced cement composition comprising the following raw materials:
   not less than 25% by mass and not more than 45% by mass of a hydraulic inorganic material;
   not less than 50% by mass and not more than 65% by mass of a siliceous material;
   not less than 5% by mass and not more than 12% by mass of a woody reinforcement;
   not less than 1% by mass and not more than 7% by mass of a mica; and
   not less than 0.25% by mass and not more than 1.5% by mass of a polyvinyl alcohol resin, wherein
   the mass ratio of CaO to SiO$_2$ (CaO : SiO$_2$) contained in the hydraulic inorganic material and the siliceous material in the raw materials is in a range of from 23:77 to 60:40,
   the hydraulic inorganic material is a portland cement,
   the siliceous material is silica sand and/or silica fume and/or fly ash and/or blast furnace slag and/or perlite powder and/or glass powder,
   a woody reinforcement is needle-leaves-tree unbleached kraft pulp and/or needle-leaves-tree bleached kraft pulp and used newspaper.

2. The fiber reinforced cement composition according to claim 1, wherein the portland cement has the following chemical composition:
   SiO$_2$: not less than 18.0% by mass and not more than 23.0% by mass,
   Al$_2$O$_3$: not less than 2.0% by mass and not more than 6.0% by mass,
   Fe$_2$O$_3$: not less than 1.0% by mass and not more than 6.0% by mass,
   CaO: not less than 60.0% by mass and not more than 65.0% by mass,
   MgO: not more than 6.0% by mass,
   SO$_3$: not more than 3.0% by mass,
   Na$_2$O: not more than 0.3% by mass, and
   K$_2$O: not more than 0.7% by mass.

3. The fiber reinforced cement composition according to claim 1, wherein the portland cement has the following mineral composition:
   C$_3$S: not less than 60.0% by mass and not more than 65.0% by mass,
   C$_2$S: not less than 9.0% by mass and not more than 13.0% by mass,
   C$_3$A: not less than 5.0% by mass and not more than 9.0% by mass, and
   C$_4$AF: not less than 6.0% by mass and not more than 10.0% by mass.

4. The fiber reinforced cement composition according to claim 1, wherein the siliceous material is silica sand which contains not less than 98% by mass of SiO$_2$ component.

5. The fiber reinforced cement composition according to claim 1, wherein the siliceous material is silica fume which contains not less than 97% by mass of SiO$_2$ component.

6. The fiber reinforced cement composition according to claim 1, wherein the siliceous material is fly ash which contains not less than 50% by mass and not more than 70% by mass of SiO$_2$ component.

7. The fiber reinforced cement composition according to claim 1, wherein the siliceous material is blast furnace slag which contains not less than 20% by mass and not more than 40% by mass of SiO$_2$ component.

8. The fiber reinforced cement composition according to claim 1, wherein the needle-leaves-tree unbleached kraft pulp and/or needle-leaves-tree bleached kraft pulp have a Canadian standard freeness of not more than 500 ml.

9. The fiber reinforced cement composition according to claim 1, wherein the used newspaper has a fiber length of not less than 0.5 mm and not more than 3.0 mm, a fiber diameter of not less than 10 μm and not more than 100 μm, and a Canadian standard freeness of not more than 350 ml.

10. The fiber reinforced cement composition according to claim 1, wherein the woody reinforcement is a mixture of two kinds of woody reinforcement.

11. The fiber reinforced cement composition according to claim 1, wherein the woody reinforcement is a mixture of needle-leaves-tree unbleached kraft pulp and/or needle-leaves-tree bleached kraft pulp and used newspaper in a ratio of the needle-leaves-tree unbleached kraft pulp and/or needle-leaves-tree bleached kraft pulp to the used newspaper in a range of from 1:4 to 4:1.

12. A fiber reinforced cement composition comprising the following raw material composition:
   not less than 28% by mass and not more than 32% by mass of portland cement as a hydraulic inorganic material;
   not less than 54% by mass and not more than 58% by mass in total of fly ash and silica fume as a siliceous material;
   not less than 8% by mass and not more than 12% by mass in total of needle-leaves-tree unbleached kraft pulp and/or needle-leaves-tree bleached kraft pulp and used newspaper as a woody reinforcement;
   not less than 2% by mass and not more than 5% by mass of mica; and
   not less than 0.5% by mass and not more than 1.25% by mass of polyvinyl alcohol resin, wherein the mass ratio of CaO to SiO$_2$, in the hydraulic inorganic material and the siliceous material is in a range of from 30:70 to 40:60, the amount of the silica fume is not less than 3% by mass and not more than 7% by mass of the total amount of the fly ash and the silica fume, the fly ash contains 50-70% by mass of SiO$_2$ component, the silica fume contains not less than 97% by mass of SiO$_2$ component, the amount of the used paper is not less than 20% by mass and not more than 50% by mass of the whole woody reinforcement consisting of the needle-leaves-tree unbleached kraft pulp and/or needle-leaves-tree bleached kraft pulp and used newspaper.

13. A fiber reinforced cement composition comprising the following raw material composition:

not less than 28% by mass and not more than 32% by mass of portland cement as a hydraulic inorganic material, not less than 54% by mass and not more than 58% by mass in total of blast furnace slag and silica fume as a siliceous material, not less than 8% by mass and not more than 12% by mass in total of needle-leaves-tree unbleached kraft pulp and/or needle-leaves-tree bleached kraft pulp and used newspaper as a woody reinforcement, not less than 2% by mass and not more than 5% by mass of mica, and not less than 0.5% by mass and not more than 1.25% by mass of a polyvinyl alcohol resin, wherein the mass ratio of CaO to SiO$_2$ in the hydraulic inorganic material and the siliceous material is in a range of from 50:50 to 60:40, the amount of the silica fume is not less than 5% by mass and not more than 20% by mass of total amount of the blast furnace slag and the silica fume, the blast furnace slag contains 20-40% by mass of SiO$_2$ component, the silica fume contains not less than 97% by mass of SiO$_2$ component, and the amount of the used paper is not less than 20% by mass and not more than 50% by mass of the total amount of the needle-leaves-tree unbleached kraft pulp and/or the needle-leaves-tree bleached kraft pulp and the used newspaper.

14. A fiber reinforced cement composition comprising the following raw material composition:

not less than 28% by mass and not more than 32% by mass of portland cement as a hydraulic inorganic material, not less than 54% by mass and not more than 58% by mass in total of fly ash and blast furnace slag as a siliceous material, not less than 8% by mass and not more than 12% by mass in total of needle-leaves-tree unbleached kraft pulp and/or needle-leaves-tree bleached kraft pulp and used newspaper as a woody reinforcement, and not less than 0.5% by mass and not more than 1.25% by mass of a polyvinyl alcohol resin, wherein the mass ratio of CaO to SiO$_2$ in the hydraulic inorganic material and the siliceous material is in a range of from 40:60 to 60:40, the fly ash contains 50-70% by mass of SiO$_2$ component, the blast furnace slag contains 20-40% by mass of SiO$_2$ component, the amount of the fly ash is not less than 30% by mass and not more than 70% by mass of total amount of the fly ash and the blast furnace slag, and the amount of the used paper is not less than 20% by mass and not more than 50% by mass of the whole woody reinforcement consisting of the needle-leaves-tree unbleached kraft pulp and/or the needle-leaves-tree bleached kraft pulp and the used newspaper, not less than 2% by mass and not more than 5% by mass of mica.

15. A fiber reinforced cement composition comprising the following raw material composition:

not less than 28% by mass and not more than 32% by mass of portland cement as a hydraulic inorganic material, not less than 54% by mass and not more than 58% by mass in total of silica sand and silica fume as a siliceous material, not less than 8% by mass and not more than 12% by mass in total of needle-leaves-tree unbleached kraft pulp and/or needle-leaves-tree bleached kraft pulp and used newspaper as a woody reinforcement, not less than 2% by mass and not more than 5% by mass of mica, and not less than 0.5% by mass and not more than 1.25% by mass of a polyvinyl alcohol resin, wherein the mass ratio of CaO to SiO$_2$ in the hydraulic inorganic material and the siliceous material is in a range of from 23:77 to 35:65, the silica sand contains not less than 98% by mass of SiO$_2$ component, the silica fume contains not less than 97% by mass of SiO$_2$ component, and the amount of the used paper is not less than 20% by mass and not more than 50% by mass of total amount of the needle-leaves-tree unbleached kraft pulp and/or the needle-leaves-tree bleached kraft pulp and the used newspaper.

16. A fiber reinforced cement product manufactured from the fiber reinforced cement composition according to any of claims 12 to 15.

17. A process for manufacturing a fiber reinforced cement product comprising the steps of:

dispersing in water a raw material composition comprising as main raw materials a hydraulic inorganic material, a siliceous material, a woody reinforcement, mica, and a polyvinyl alcohol resin mixed in a mass ratio of CaO to SiO$_2$ contained in the hydraulic inorganic material and the siliceous material in the raw materials in a range of from 23:77 to 60:40 to give a slurry of the raw materials;

forming a green mat from the slurry; and pressing the green mat by press molding and thereafter curing the mat in an autoclave at a temperature not lower than 150° C., wherein the hydraulic inorganic material is a portland cement, the siliceous material is silica sand and/or silica fume and/or fly ash and/or blast furnace slag and/or perlite powder and/or glass powder, a woody reinforcement is needle-leaves-tree unbleached kraft pulp and/or needle-leaves-tree bleached kraft pulp and used newspaper.

18. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 25% by mass and not more than 45% by mass of a hydraulic inorganic material;

not less than 50% by mass and not more than 65% by mass of a siliceous material;

not less than 5% by mass and not more than 12% by mass of a woody reinforcement;

not less than 1% by mass and not more than 7% by mass of a mica; and not less than 0.25% by mass and not more than 1.5% by mass of a polyvinyl alcohol resin, wherein the mass ratio of CaO to $SiO_2$ (CaO : $SiO_2$) contained in the hydraulic inorganic material and the siliceous material in the raw materials is in a range of from 23:77 to 60:40, the hydraulic inorganic material is a portland cement, the siliceous material is silica sand and/or silica fume and/or fly ash and/or blast furnace slag and/or perlite powder and/or glass powder, a woody reinforcement is needle-leaves-tree unbleached kraft pulp and/or needle-leaves-tree bleached kraft pulp and used newspaper.

19. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of portland cement as a hydraulic inorganic material;

not less than 54% by mass and not more than 58% by mass in total of fly ash and silica fume as a siliceous material;

not less than 8% by mass and not more than 12% by mass in total of needle-leaves-tree unbleached kraft pulp and/or needle-leaves-tree bleached kraft pulp and used newspaper as a woody reinforcement;

not less than 2% by mass and not more than 5% by mass of mica; and not less than 0.5% by mass and not more than 1.25% by mass of polyvinyl alcohol resin, wherein the mass ratio of CaO to $SiO_2$ in the hydraulic inorganic material and the siliceous material is in a range of from 30:70 to 40:60, the amount of the silica fume is not less than 3% by mass and not more than 7% by mass of the total amount of the fly ash and the silica fume, the fly ash contains 50-70% by mass of $SiO_2$ component, the silica fume contains not less than 97% by mass of $SiO_2$ component, the amount of the used paper is not less than 20% by mass and not more than 50% by mass of the whole woody reinforcement consisting of the needle-leaves-tree unbleached kraft pulp and/or needle-leaves-tree bleached kraft pulp and used newspaper.

20. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of portland cement as a hydraulic inorganic material, not less than 54% by mass and not more than 58% by mass in total of blast furnace slag and silica fume as a siliceous material, not less than 8% by mass and not more than 12% by mass in total of needle-leaves-tree unbleached kraft pulp and/or needle-leaves-tree bleached kraft pulp and used newspaper as a woody reinforcement, not less than 2% by mass and not more than 5% by mass of mica, and not less than 0.5% by mass and not more than 1.25% by mass of a polyvinyl alcohol resin, wherein the mass ratio of CaO to $SiO_2$ in the hydraulic inorganic material and the siliceous material is in a range of from 50:50 to 60:40, the amount of the silica fume is not less than 5% by mass and not more than 20% by mass of total amount of the blast furnace slag and the silica fume, the blast furnace slag contains 20-40% by mass of $SiO_2$ component, the silica fume contains not less than 97% by mass of $SiO_2$ component, and the amount of the used paper is not less than 20% by mass and not more than 50% by mass of the total amount of the needle-leaves-tree unbleached kraft pulp and/or the needle-leaves-tree bleached kraft pulp and the used newspaper.

21. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of portland cement as a hydraulic inorganic material, not less than 54% by mass and not more than 58% by mass in total of fly ash and blast furnace slag as a siliceous material, not less than 8% by mass and not more than 12% by mass in total of needle-leaves-tree unbleached kraft pulp and/or needle-leaves-tree bleached kraft pulp and used newspaper as a woody reinforcement, and not less than 0.5% by mass and not more than 1.25% by mass of a polyvinyl alcohol resin, wherein the mass ratio of CaO to $SiO_2$ in the hydraulic inorganic material and the siliceous material is in a range of from 40:60 to 60:40, the fly ash contains 50-70% by mass of $SiO_2$ component, the blast furnace slag contains 20-40% by mass of $SiO_2$ component, the amount of the fly ash is not less than 30% by mass and not more than 70% by mass of total amount of the fly ash and the blast furnace slag, and the amount of the used paper is not less than 20% by mass and not more than 50% by mass of the whole woody reinforcement consisting of the needle-leaves-tree unbleached kraft pulp and/or the needle-leaves-tree bleached kraft pulp and the used newspaper, not less than 2% by mass and not more than 5% by mass of mica.

22. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of portland cement as a hydraulic inorganic material, not less than 54% by mass and not more than 58% by mass in total of silica sand and silica fume as a siliceous material, not less than 8% by mass and not more than 12% by mass in total of needle-leaves-tree unbleached kraft pulp and/or needle-leaves-tree bleached kraft pulp and used newspaper as a woody reinforcement, not less than 2% by mass and not more than 5% by mass of mica, and not less than 0.5% by mass and not more than 1.25% by mass of a polyvinyl alcohol resin, wherein the mass ratio of CaO to $SiO_2$ in the hydraulic inorganic material and the siliceous material is in a range of from 23:77 to 35:65, the silica sand contains not less than 98% by mass of $SiO_2$ component, the silica fume contains not less than 97% by mass of $SiO_2$ component, and the amount of the used paper is not less than 20% by mass and not more than 50% by mass of total amount of the needle-leaves-tree unbleached kraft pulp and/or the needle-leaves-tree bleached kraft pulp and the used newspaper.

* * * * *